March 1, 1966  N. A. BEHRENS ETAL  3,237,600
FARROWING PEN
Filed April 17, 1964  2 Sheets-Sheet 1

INVENTORS
NORMAN A. BEHRENS
REINHARD E HENKE
BY
Duck & Zarley
ATTORNEYS

INVENTORS
NORMAN A. BEHRENS
REINHARD E. HENKE
BY
ATTORNEYS

United States Patent Office 3,237,600
Patented Mar. 1, 1966

3,237,600
FARROWING PEN
Norman A. Behrens, Rte. 1, and Reinhard E. Henke, 1614 Behlen St., both of Columbus, Nebr.
Filed Apr. 17, 1964, Ser. No. 360,716
10 Claims. (Cl. 119—20)

This invention relates to a farrowing pen and more particularly to a farrowing pen having adjustable and movable wall members.

Sows have a notorious reputation for crushing or laying on their new born pigs. The ordinary farrowing pens provide no protection for the young pigs. Farrowing units have been devised which are rectangular in shape to prevent the sow from crushing her young pigs. Sows are usually placed in farrowing pens a few days before farrowing time. The rectangular pens which necessarily restrict the sow's movement seem to cause the sow great stress which sometimes causes otherwise normal pigs to be born dead. If the farrowing pens are too large the sow has the opportunity to crush her young pigs.

Another disadvantage in all farrowing pens is that the pens are drafty and sometimes the newborn pigs become ill and die.

A further disadvantage in the existing farrowing pens is that the little pigs have difficulty in nursing the sow.

Therefore, a principal object of this invention is to provide a farrowing pen which has adjustable and movable wall members.

A further object of this invention is to provide a farrowing pen which prevents a sow from crushing her young pigs.

A further object of this invention is to provide a farrowing pen which does not unnecessarily restrict the sow's movements prior to farrowing time.

A further object of this invention is to provide a farrowing pen which prevents drafts.

A further object of this invention is to provide a farrowing pen which facilitates nursing of the young pigs.

A still further object of this invention is to provide a farrowing pen which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 1:
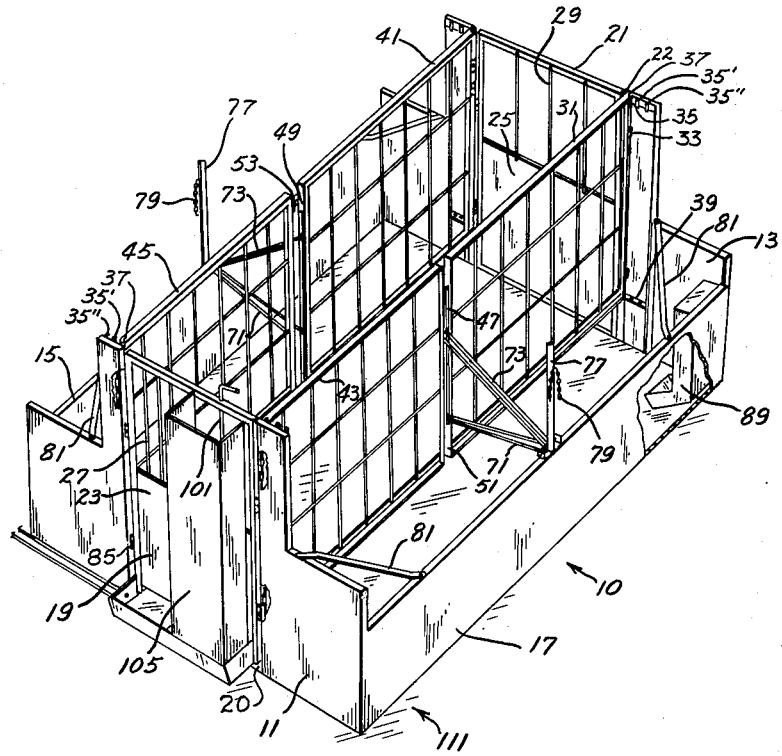
FIG. 1 is a perspective view of the device.

The numeral 10 generally designates a farrowing pen having ends 11 and 13 with sides 15 and 17 extending therebetween. A door 19 is vertically, slidably mounted in door opening 20 of end 11 and door 21 is vertically slidably mounted in door opening 22 in end 13. Doors 19 and 21 have solid portions 23 and 25 and grill portions 27 and 29 respectively. The doors 19 and 21 may be installed in ends 11 and 13 with the grill portion above the solid portion as illustrated in FIG. 1 or mounted in an inverted position with the grill portion being below the solid portion.

A gate 31 having sleeve members 33 secured to its outer, upper end is hingedly secured to one of horizontally disposed collars 35, 35' or 35" secured to end 13 adjacent door 21 by means of pin 37 extending downwardly through sleeve members 33 and one of collars 35, 35' or 35" and through bracket 39 secured to end 13. A gate 41 is hingedly secured to end 13 adjacent the other side of door 21 in identical fasion to the method in which gate 31 was installed. Gates 43 and 45 are hingedly secured to end 11 adjacent either side of door 19 in identical fashion to the method of installation of gates 31 and 41. Gates 31, 41, 43 and 45 have vertically disposed rods 47, 49, 51 and 53 secured to their inner ends respectively and in a spaced relation thereto.

Rods 47, 49, 51 and 53 each have two clamps 55 slidably mounted thereon. Clamp 55 is comprised of a first sleeve member 57 which embraces one of rods 47, 49, 51 and 53 and has a screw member 59 theadably extending through nut 61 into sleeve member 57 which is adapted to have its inner end engage the embraced rod. A second sleeve member 63 is secured to sleeve member 57 by welding or the like and has its axis transverse to the axis of sleeve member 57.

Sides 15 and 17 each have a substantially U-shaped bracket 65 secured to their upper edges by any convenient means and have holes 67 in the sides thereof. A hinge pin 69 extends through a pair of registering holes 67 in each of brackets 65 parallel to sides 15 and 17 and has pivotally secured thereto arm members 71, 71', 73 and 73'. Arm members 71, 71', 73 and 73' each have their inner ends bent to extend substantially at a right angle to the longitudinal axis of the arm members. These bent inner ends of arm members 71, 71', 73 and 73' each extend through sleeve member 63 on a clamp 55 and are retained therein by means of cotter key 75.

An upstanding post 77 is secured at its lower end to each bracket 65 and has a chain 79 secured thereto adjacent its upper end by any convenient method. A plurality of braces 81 are secured to side 17 and extend to ends 11 and 13 as illustrated in FIG. 1. Braces 81 are also secured to side 15 and extend to ends 11 and 13. It will be noted that doors 19 and 21 are secured to ends 11 and 13 respectively by means of rods 83 extending downwardly through sleeves 85 mounted on either side of doors 19 and 21 and through sleeves 87 mounted on ends 11 and 13 adjacent doorways 20 and 22 respectively.

Figures 2, 3:
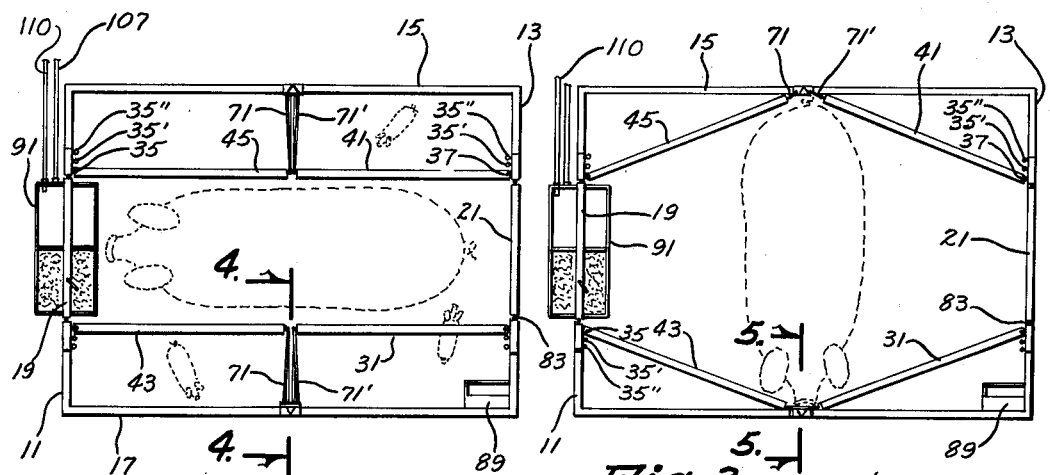
FIG. 2 is a top plan view of the device in a rectangular shape.
FIG. 3 is a top plan view of the device in a diamond shape.

A creep feeder 89 is secured to the inside surface of side 17 by any convenient method as illustrated in FIGS. 1, 2 and 3.

Door member 19 has secured to its lower end a trough means 91 which is divided into two compartments 93 and 95 by partition 97. Compartment 93 has a gate 99 vertically slidably mounted therein adjacent the inner side of door 19 and having an upwardly extending rod member 101 secured thereto. A clamp member 103 is secured to door 19 by any convenient method and embraces rod member 101. An upwardly extending feed chute 105 is secured to the outside surface of door 19 by any convenient method and has its lower end in communication with compartment 93. Compartment 95 is supplied with water by means of pipe 107 being connected to inlet 109 mounted on trough means 91.

The numeral 111 generally indicates a floor, preferably slightly sloping.

The normal mode of operation is as follows:

Farrowing pen 10 is first adjusted to the truncated diamond shape illustrated in FIG. 3. This is accomplished by loosening screw member 59 in each of the two clamps 55 mounted on rods 47, 49, 51 and 53. Arm members 71, 71', 73 and 73' on each side of pen 10 may be pivoted upwardly to the position shown in FIG. 5 as clamps 55 will slidably move upwardly on rods 47, 49, 51 and 53. As arms 71, 71', 73 and 73' are moved upwardly, gates 31, 41, 43 and 45 will hingedly move to permit the inner ends thereof to move outwardly. Chain 79 on post 71 on side 15 is then secured to gates 31 and 41 to maintain them in said diamond position. Chain 79 on post 71 on side 17 is then secured to gates 43 and 45 to maintain them in the position illustrated in FIG. 3.

One of doors 19 or 21 will then be opened to allow a sow to enter. This is accomplished by removing one of rods 83 and hingedly opening the door.

The sow should be put into pen 10 at least three days before farrowing. This allows her to become acquainted with the surroundings and reduces the stress that often causes otherwise normal pigs to be born dead. Ordinarily when a sow is put in a farrowing pen the cramped quarters tend to cause her great stress. This is eliminated by opening pen 10 to a diamond position initially. The diamond position also allows the sow to exercise herself and facilitates easy cleaning of the pen without disturbing the sow. The sow obtains food and water by means of trough means 91.

Figures 4, 5:
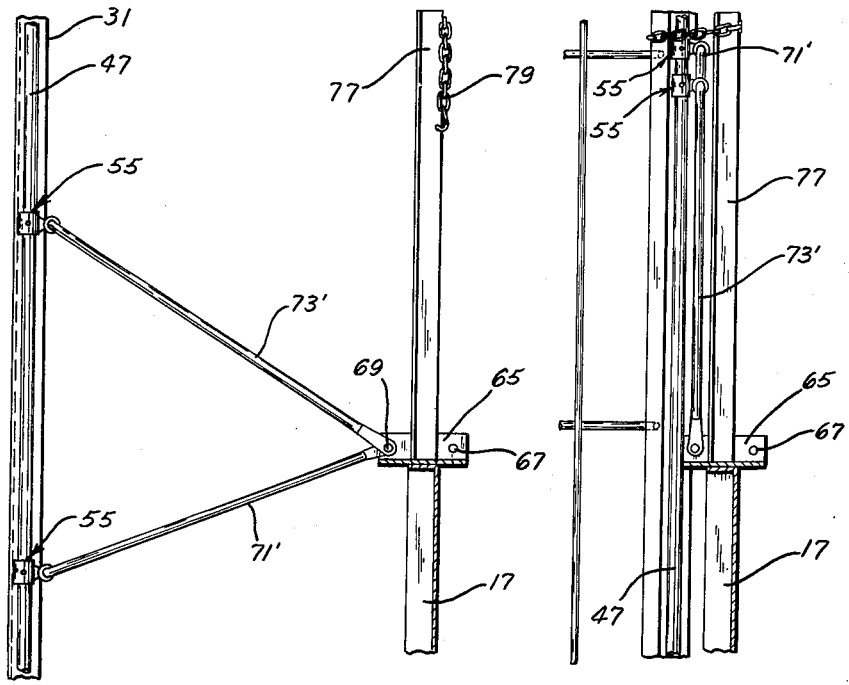
FIG. 4 is a sectional view of the device as seen on line 4—4 of FIG. 2 at an enlarged view.
FIG. 5 is a sectional view of the device as seen on line 5—5 of FIG. 3, at an enlarged scale.
Figures 6, 7:
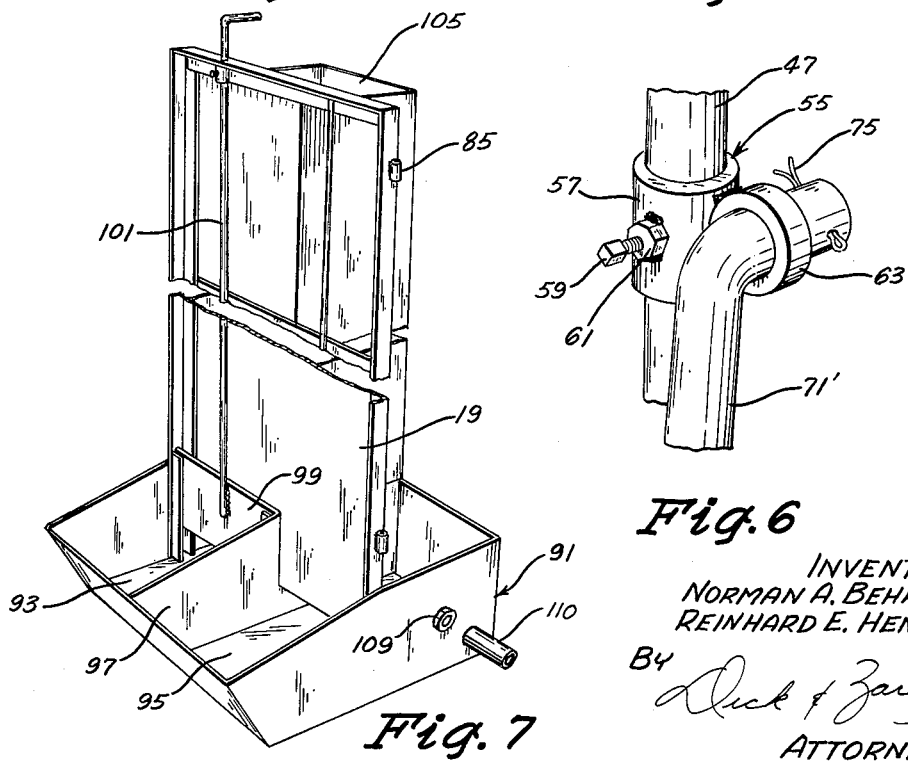
FIG. 6 is a fragmentary perspective view of the clamp means utilized for maintaining the gate members in fixed positions.
FIG. 7 is a perspective view of a door means with its associated feed and watering devices mounted thereon.

At farrowing time, pen 10 is easily adjusted to the rectangular position illustrated in FIG. 2. This is accomplished by loosening chains 79. Gates 31, 41, 43 and 45 are hingedly moved inwardly and in so doing clamps 55 will slidably move downwardly on rods 47, 49, 51 and 53 to the position illustrated in FIG. 4. When gates 31, 41, 43 and 45 have been moved to a rectangular position, screws 59 in each of clamps 55 will be tightened to maintain the position desired. The relative positioning of arms 71, 71', 73 and 73' add great strength to the device. Arms 71 and 71' will be extending slightly downwardly towards gates 31 and 41 or gates 43 and 45 while arms 73 and 73' will be extending slightly upwardly as illustrated in FIG. 4. This opposing relationship between the arm members prevents the sow from pushing the gates outwardly. The rectangular position allows the sow a minimum of movement which prevents her from crushing or laying on the little pigs while they can still nurse with ease and safety.

It will be noted that gates 31, 41, 43 and 45 have their lower ends in a spaced relationship with floor 111. This permits the little pigs to move beneath the gates to the creep areas between the gates and sides 15 or 17. The sow cannot possibly gain access to the little pigs while they are in this creep area. It should also be noted that the sides 13 and 17 extend to the floor 111. This is an anti-draft feature to protect the little pigs from drafts and to hold the warmth in the creep area where the newborn pigs need it.

The pen will be maintained in the rectangular position for two to three days after farrowing, after which period the pen will be placed in the diamond position again. The first few days are the most critical times insofar as the sow crushing the little pigs. Even with the pen in the diamond shape the little pigs still have access to a portion of creep area to which the sow cannot enter.

It should also be noted that gates 31, 41, 43 and 45 may also each be raised or lowered or moved outwardly. Gates 31, 41, 43 and 45 may be moved outwardly by merely moving the gates to one of collars 35' or 35". The gates may be raised or lowered simply by changing the relationship of sleeves 33 on gates 31, 41, 43 and 45 with respect to collars 35, 35' or 35". The horizontal adjustability feature permits the pen to be adjusted to compensates for different sized sows. The vertical adjustability of gates 31, 41, 43 and 45 gives the little pigs ample room for nursing.

The reversible door may be inverted for the sow so that the grill portion is beneath the solid portion for ventilation for the sow or to allow the little pigs into an alleyway for feed and water. The doors have the ability to swing open either way for right or left entry. The pen 10 can also be used in a house with self-opening doors allowing the sow to feed and dung in an area other than the pen 10.

The creep feeder 89 permits the little pigs to feed without leaving the pen.

A further advantage of the device is that it is completely collapsible for storage when not in use.

Some changes may be made in the construction and arrangement of our farrowing pen without departing from the real spirit and purpose of our invention, and it is our intention to cover by our claims, any modified forms of structure or use of mechanical equivalents which may be reasonably included within their scope.

We claim:
1. In a farrowing device,
  a rectangular container having opposite upright ends and side members extending therebetween,
  a first door on one end of said container,
  a second door on the other end of said container,
  a first gate hingedly secured at one of its ends to one end of said container adjacent one side of said first door,
  a second gate hingedly secured at one of its ends to one end of said container adjacent the other side of said first door,
  a third gate hingedly secured at one of its ends to the other end of said container adjacent one side of said second door,
  a fourth gate hingedly secured at one of its ends to the other end of said container adjacent the other side of said second door,
  said first and third gates having their inner ends extending towards each other at times,
  said second and fourth gates having their inner ends extending towards each other at times,
  means for detachably locking said first and third gates in various positions of swinging movement at times,
  and means for detachably locking said second and fourth gates in various positions of their swinging movement at times.

2. The structure of claim 1 wherein said means for locking said first, third, second and fourth gates in various positions of their swinging movement includes a plurality of locking arms hingedly secured at one of their ends to each of said container and movably secured at their other end to the inner free ends of said first and third gates or said second and fourth gates.

3. The structure of claim 1 wherein said first, second, third and fourth gates are adjustably movable both vertically and horizontally.

4. The structure of claim 1 wherein one of said first and second doors have mounted thereon a feed and water trough means.

5. The structure of claim 1 wherein said first, second, third and fourth gates are hingedly movable to form a rectangular shape therebetween or to form a truncated diamond shape therebetween.

6. In a farrowing device,
  a rectangular container having opposite upright ends and side members extending therebetween,
  a first door on one end of said container,
  a second door on the other end of said container,
  a first gate hingedly secured at one of its ends to one end of said container adjacent one side of said first door,
  a second gate hingedly secured at one of its ends to one end of said container adjacent the other side of said first door,
  a third gate hingedly secured to one of its ends to the other end of said container adjacent one side of said second door, a fourth gate hingedly secured at one of its ends to the other end of said container adjacent the other side of said second door, said first and third gates having their inner ends extending towards each other at times, said second and fourth gates having their inner ends extending towards each other at times, first and second arm members pivotally secured at their outer end to one side of said container and having their inner ends slidably, pivotally secured to the free ends of said first and third gates respectively adjacent their lower ends, third and fourth arm members pivotally secured at their outer ends to one side of said container and having their inner ends slidably, pivotally secured to the free ends of said first and third gates respectively adjacent their upper ends, fifth and sixth arm members pivotally secured at their outer ends to the other side of said container and having their inner ends slidably, pivotally secured to the free ends of said second and fourth gates respectively adjacent their lower ends, seventh and eighth arm members pivotally secured at their outer ends to the other side of said container and having their inner ends slidably, pivotally secured to the free ends of said second and fourth gates respectively adjacent their upper ends, and means on said first, second, third and fourth gates for detachably locking said first, second, third and fourth gates in various positions of their swinging movement.

7. The device of claim 6 wherein said means for detachably locking said first, second, third and fourth gates in various positions of swinging movement includes a clamp means vertically slidably mounted on each of said gates, each of said clamp means comprised of a first sleeve member embracing a portion of one of said gates; a second sleeve member secured to said first sleeve member and being transverse thereto and adapted to detachably receive the inner end of one of said arm members and a screw means threadably extending inwardly into said first sleeve member and engaging said gate at times.

8. The device of claim 6 wherein said first and second doors each have a solid portion and a grill portion thereabove and each door is adapted to be invertably mounted on said container.

9. The device of claim 6 wherein said first door has a trough means secured to its lower end and a means mounted thereon to supply feed and water to said trough.

10. The device of claim 6 wherein said container has a creep feeder means secured to the inside surface of one of said sides.

References Cited by the Examiner
UNITED STATES PATENTS 2,729,196    1/1956    Breitenbach _____ 119—20
3,020,882    2/1962    Browning _____ 119—82

SAMUEL KOREN, *Primary Examiner.*

HUGH R. CHAMBLEE, *Examiner.*